(No Model.)
P. T. LONERGAN.
RAKING ATTACHMENT FOR FURNACES.
No. 248,765. Patented Oct. 25, 1881.
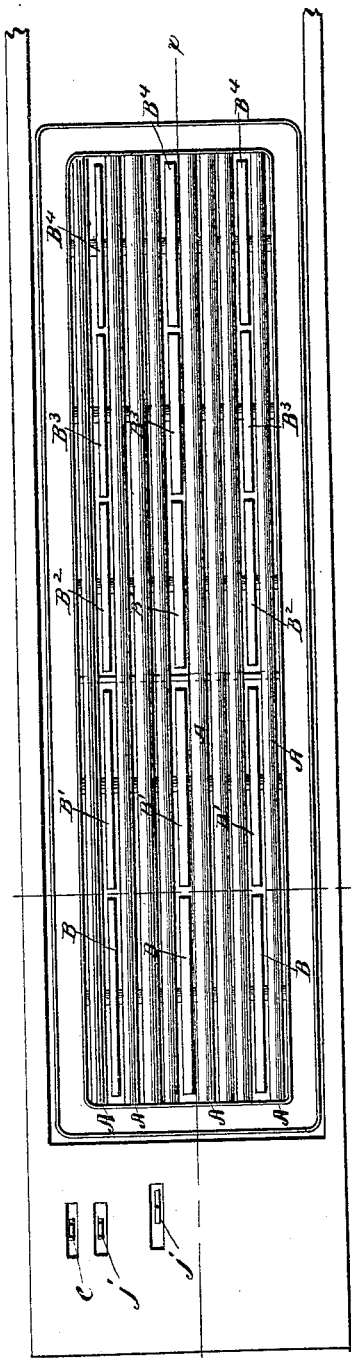
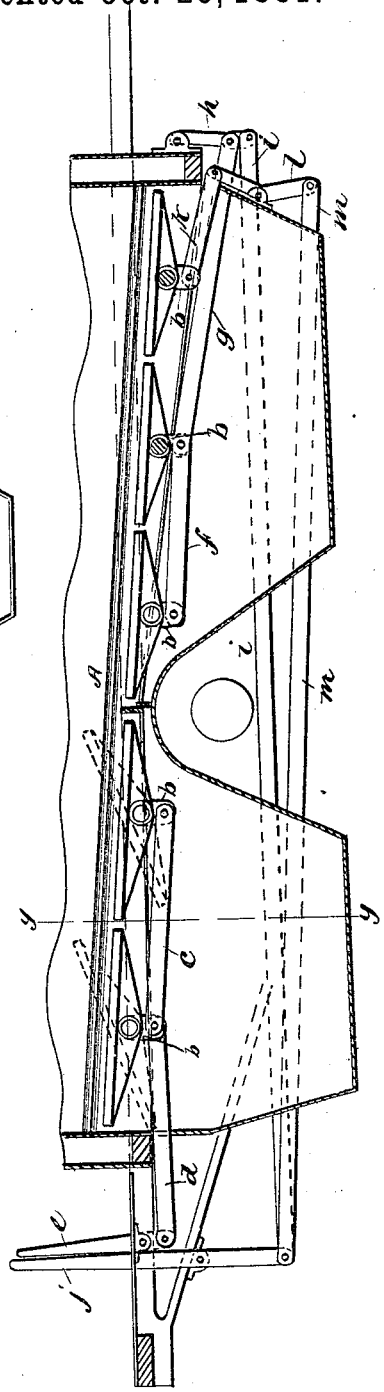

UNITED STATES PATENT OFFICE.

PHILIP T. LONERGAN, OF SCRANTON, PENNSYLVANIA, ASSIGNOR OF TWO-THIRDS TO THOMAS B. HOWE AND ARTHUR H. LEE, OF SAME PLACE.

RAKING ATTACHMENT FOR FURNACES.

SPECIFICATION forming part of Letters Patent No. 248,765, dated October 25, 1881.

Application filed September 7, 1881. (No model.)

*To all whom it may concern:*

Be it known that I, PHILIP T. LONERGAN, of Scranton, Lackawanna county, State of Pennsylvania, have invented a certain new and Improved Raking Attachment for Locomotive and other Furnaces; and I do hereby declare the following to be a full, clear, and exact description of the same, reference being had to the accompanying drawings, forming part of this specification, in which—

Figure 1 is a top-plan view of a locomotive-furnace provided with my improvements; Fig. 2, a longitudinal section of the same, taken on the line $x\ x$, Fig. 1; Fig. 3, a cross-section, showing the arrangement of the grate-bars.

Similar letters of reference in the several figures denote the same parts.

My invention consists, primarily, in the combination, with the grate-bars of a locomotive or other furnace, of a series of rocking rake-sections or agitators, which, when vibrated, work between the grate-bars and disengage and remove the ashes and clinkers from the fire, but which normally lie in horizontal position below the top surface of the grate-bars.

It further consists in the peculiar manner of mounting and operating the rake-sections or agitators, all which I will now proceed to describe.

In the drawings, A A represent the grate-bars of a locomotive-furnace, made hollow for the admission of water, as shown, or of any other preferred construction.

B B' B² B³ B⁴ are a series of rake-sections or agitators, each consisting of a cross-shaft mounted in bearings beneath the grate and carrying a set of bars, which are adapted to work up between the grate-bars when said sections are vibrated. Each of the sections is provided with a depending arm, $b$, to which the means for vibrating it is attached. The sections B B' are preferably connected to a bar, $c$, so as to cause them to operate simultaneously, and to the arm of B is articulated a bar or pitman, $d$, connected at its opposite end to the short arm of a hand-lever, $e$, which extends up into and and is operated within the cab of the locomotive. The arms of the sections B² B³ are likewise connected to a bar, $f$, and said sections are operated through the medium of a bar, $g$, fulcrum-lever $h$, bar $i$, and another operating hand-lever, $j$, also projecting within the cab, as shown. The section B⁴ is operated by means of a bar, $k$, fulcrum-lever $l$, and a bar, $m$, connected to the lower end of a hand-lever, $j'$. All the grate-sections or agitators normally lie below the top surface of the grate-bars; but when it is desired to rake the front of the furnace one or both of the levers $j\ j'$ are worked back and forth, so as to cause all or a portion of the sections, B² B³ B⁴, to rock on their shafts and project their bars up and down between the grate-bars into and out of the fire. When the rear of the furnace is to be raked the lever $e$ is worked and the sections B B' are thrown into operation in like manner.

In the furnace shown the water-bars are arranged in sets of three triangularly, thus forming pockets, through the bottom of which the rake-sections are adapted to work. With such an arrangement of bars greater supporting power is given the grate, and a better draft is afforded than where the bars are arranged horizontally in line, while the vibrating raking-sections act very effectively in removing the ashes, &c., which accumulate in the pockets.

I claim as my invention—

1. The combination, with the water-bars of a furnace, of the vibrating rake-sections or agitators B B', &c., mounted on shafts running transversely below the water-bars, and having their upper surfaces lying normally below the top surfaces of the water-bars, and the connecting rods and levers for vibrating said raking-sections, substantially as described.

2. The combination, with the water-bars of the furnace, arranged in sets of three, triangularly, as shown, of the vibrating raking-sections mounted on shafts running transversely below the water-bars, and having their top surfaces lying normally below the upper surfaces of the lowest water-bars, and the connecting-rods and operating-levers, substantially as described.

PHILIP T. LONERGAN.

Witnesses:
C. W. ROESLER,
F. W. ORAM.